Figures 1, 2:
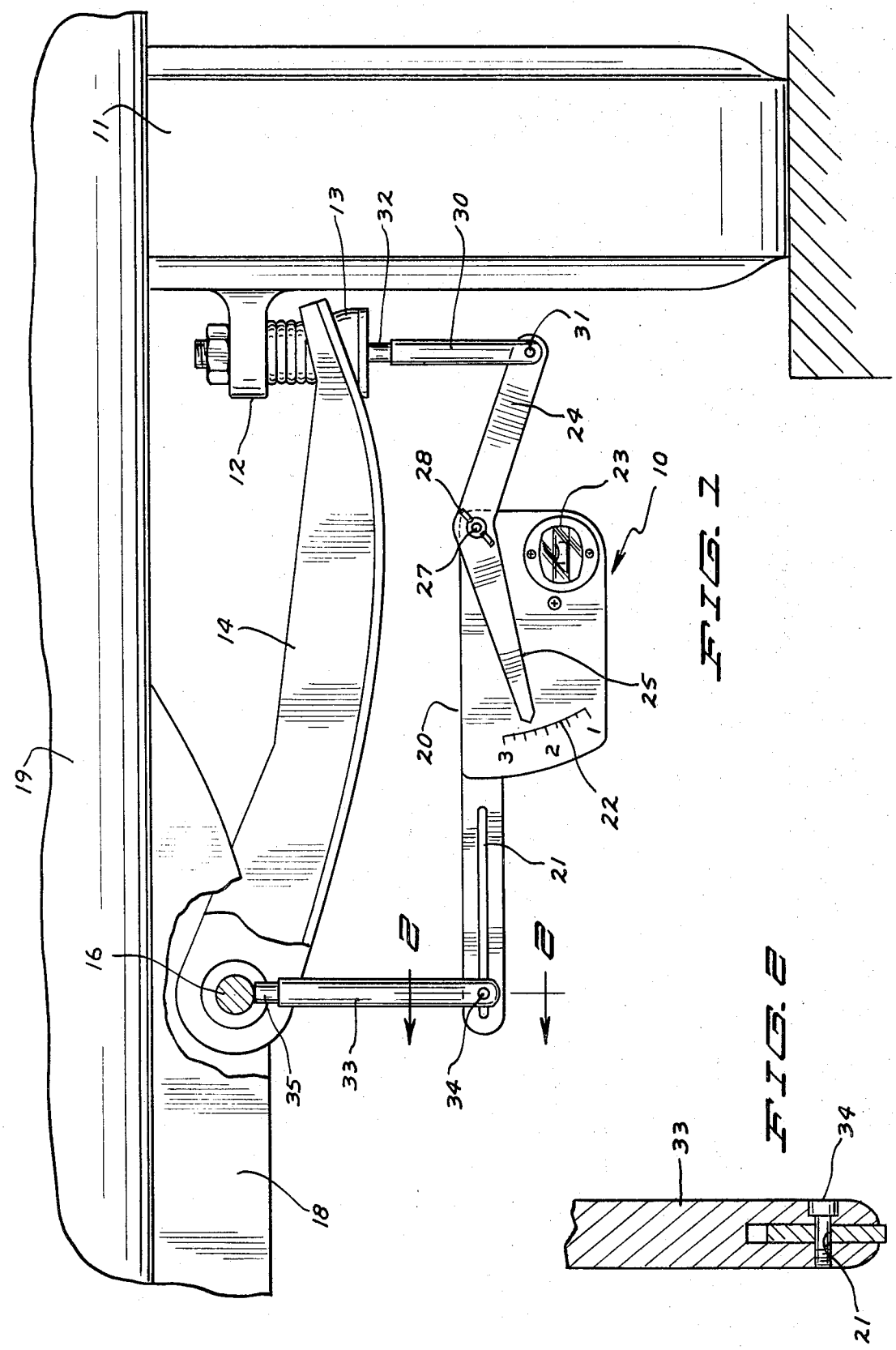

United States Patent [19]
Rishovd

[11] 3,835,547
[45] Sept. 17, 1974

[54] TORSION BAR GAUGE

[75] Inventor: Sigurd A. Rishovd, Minneapolis, Minn.

[73] Assignee: Royal Industries, Inc., Osseo, Minn.

[22] Filed: Feb. 20, 1973

[21] Appl. No.: 333,635

[52] U.S. Cl............ 33/347, 33/169 R, 33/180 AT, 33/371
[51] Int. Cl............................................ G01c 9/28
[58] Field of Search......... 33/180 AT, 181 AT, 203, 33/203.15, 203.17, 203.21, 347, 370, 371, 169 R

[56] References Cited
UNITED STATES PATENTS

| | | | |
|---|---|---|---|
| 2,853,790 | 9/1958 | MacMillan | 33/180 AT |
| 2,900,734 | 8/1959 | Richards | 33/180 AT |
| 3,210,857 | 10/1965 | Lill | 33/180 AT |
| 3,783,521 | 1/1974 | Schmidt | 33/181 AT |

*Primary Examiner*—Louis R. Prince
*Assistant Examiner*—Charles E. Phillips
*Attorney, Agent, or Firm*—Warren A. Strum

[57] ABSTRACT

A gauge for adjusting the suspension of automobiles using torsion bar suspension systems having a frame including indicia and a gravity sensing means in the form of a bubble level and which further includes a lever arm pivotally disposed having one end forming a pointer in combination with the indicia and a pair of magnetic support members, one pivotally disposed in an elongated slot in one end of the frame and the other pivotally disposed on the other end of the lever arm.

2 Claims, 2 Drawing Figures

PATENTED SEP 17 1974      3,835,547

TORSION BAR GAUGE

BACKGROUND OF THE INVENTION

This invention is concerned with adjusting or checking the suspension height of motor vehicles which have torsion bar suspension systems, as distinguished from leaf or coil springs heretofore in common use. The torsion bar suspension systems include an elongated metal member that is rigidly attached at one end to the frame and which has a control arm rigidly attached to the other end for rotation thereabout. The end of the control arm is attached to a wheel or other portion of the wheel assemblies of the automobile. In order to adjust the torsion bar by twisting it about the end attached to the vehicle, it has been determined that the relative height between the ends of the control arm may be used to determine the condition of the torsion bar suspension system and to adjust the same if adjustment is required.

SUMMARY OF THE INVENTION

An object of my invention is to provide an improved torsion bar suspension measuring gauge. A further object of my invention is to provide an improved measuring gauge for torsion bar suspension systems which may be directly calibrated and adjusted for various different types of torsion bar suspension systems. It is a further object of my invention to provide an improved torsion bar suspension system gauge which is of greater efficiency and less complicated than the systems heretofore in use.

Other objects and advantages of my invention will become apparent from a consideration of the appended specification, claims and drawings in which:

FIG. 1 is a fragmentary view of the front suspension system of an automobile to which my torsion bar gauge has been applied; and FIG. 2 is a small sectional view taken across section line 2—2 on FIG. 1 of the drawings.

Referring now to the drawings, my invention is shown in the form of a gauge to be applied to the front control arms of a torsion bar suspension system for a motor vehicle and is indicated generally by reference character 10.

The front parts of a vehicle are indicated as: The front tires 11, a steering knuckle assembly 12, a lower ball joint housing 13 and a lower control arm 14 connected to lower ball joint housing 13 at one end and to a torsion bar 16 at the other end; a portion of the frame of the vehicle is indicated by reference character 18 and a portion of the front bumper is indicated by reference character 19.

Gauge 10 is shown in operable disposition as being suspended from the torsion bar 16 and from the other end of lower control arm 14 adjacent lower ball joint housing 13.

Gauge 10 includes a main frame 20 having an elongated slot 21 at one end and indicia scale 22 on its body and includes a gravity sensing means shown in the form of a bubble level 23. A lever arm 24 having a pointer 25 at one end is pivoted about a screw member 27 extending through main frame 20 and is adjustably pivotally disposed thereon and adapted to be fixed in pivoted position by virtue of the wing nut 28.

A support means 30 is pivotally disposed on the outer end of lever arm 24 through pivot pin 31 and includes a magnetic portion 32 at its upper end. A further support means 33 is shown pivotally slidably disposed in slot 21 on main frame 20 by pin 34 and includes a similar magnetic structure 35 at its upper end.

In use, lever arm is adjusted to the proper indicia on the scale of the device as may be determined by reference to the published material relating to the adjustment of the torsion bar suspension system for a particular vehicle. Then one end of the device is placed upon the lower outer end of the control arm and the other end is placed upon the torsion bar spring and the unit will be suspended therefrom by use of the magnetic structures at the upper ends of the support means. If the suspension system being observed is properly adjusted, the gravity sensing means shown in the form of a bubble level will indicate so, if not, the other end of the torsion bar may be adjusted while looking at the bubble level to determine when the suspension system falls into proper adjustment.

Having now therefore fully illustrated and described my invention, what I claim to be new and desire to protect by Letters Patent is:

1. In a torsion bar adjusting gauge, the combination comprising:

an elongated frame including a main portion and an elongated portion at one end of said main portion, said elongated portion having an elongated slot therein, said main portion having a gravity sensing means and indicia thereon, a lever arm adjustably fixedly pivotally mounted on the other end of said main portion, said lever arm having one end adapted to adjustably overlie a portion of said main portion in fixed cooperation with said indicia, first vehicle-engaging support means having one end pivotally and slideably disposed in said slot, second vehicle-engaging support means having one end pivotally disposed on the other end of said lever arm.

2. The apparatus of claim 1 in which the support means include magnets at the vehicle engaging ends thereof.

* * * * *